(12) United States Patent
Rausch et al.

(10) Patent No.: US 7,937,063 B1
(45) Date of Patent: May 3, 2011

(54) METHOD AND SYSTEM FOR CONFIGURING A TOWER TOP LOW NOISE AMPLIFIER

(75) Inventors: Walter F. Rausch, Shawnee, KS (US); David A. Maples, Manassas, VA (US)

(73) Assignee: Clear Wireless LLC, Kirkland, WA (US)

( * ) Notice: Subject to any disclaimer, the term of this patent is extended or adjusted under 35 U.S.C. 154(b) by 829 days.

(21) Appl. No.: 11/847,023

(22) Filed: Aug. 29, 2007

(51) Int. Cl.
 *H04B 1/16* (2006.01)
(52) U.S. Cl. .......... 455/341; 455/293; 455/291; 455/78; 455/80; 455/91; 455/88; 455/101; 455/575.7; 455/562.1; 370/294; 370/275; 370/280; 370/278; 333/101; 333/100; 333/124; 343/844; 343/872; 343/904
(58) Field of Classification Search .................. 455/341, 455/293, 291, 78, 80, 82–83, 88, 101, 575.7, 455/562.1, 91; 370/294, 275, 280, 278; 333/101, 333/100, 124; 343/844, 872, 904
See application file for complete search history.

(56) References Cited

U.S. PATENT DOCUMENTS

| | | | | |
|---|---|---|---|---|
| 6,591,086 | B1* | 7/2003 | Pleasant | 455/78 |
| 7,538,740 | B2* | 5/2009 | Korisch et al. | 343/844 |
| 7,616,940 | B2* | 11/2009 | Holder et al. | 455/341 |
| 2006/0052065 | A1* | 3/2006 | Argaman et al. | 455/101 |
| 2010/0087236 | A1* | 4/2010 | Pallone et al. | 455/575.7 |

* cited by examiner

*Primary Examiner* — Matthew D Anderson
*Assistant Examiner* — April G Gonzales
(74) *Attorney, Agent, or Firm* — McDonnell Boehnen; Hulbert & Berghoff LLP

(57) ABSTRACT

A method and system for protecting a LNA by acquiring a radio frequency control channel signal at a tower top low noise amplifier (TTLNA) system. In response to acquiring the radio frequency control channel signal, LNA mode information is determined from the acquired radio frequency control channel signal. Based at least in part on the determination, the TTLNA is configured to either receive mode when the LNA mode information indicates receive mode or transmit mode when the LNA mode information indicates transmits mode. In an exemplary embodiment, the TTLNA is configured to receive mode only after a determination is made that there is no transmit energy present on the feedline connecting the BTS and the antenna. In another exemplary embodiment, the TTLNA is initialized in transmit mode.

18 Claims, 4 Drawing Sheets

METHOD AND SYSTEM FOR CONFIGURING A TOWER TOP LOW NOISE AMPLIFIER

FIELD OF THE INVENTION

The present invention relates to wireless communications and, more particularly, to a method and system of protecting a sensitive tower top low noise amplifier.

BACKGROUND

A given wireless communication system typically includes a base transceiver station (BTS) that provides service to one or more mobile stations within the coverage area of the BTS. The BTS may include a radio antenna system having one or more antennas mounted on a tower. A given antenna may transmit downlink signals to and/or receive uplink signals from one or more mobile stations serviced by the BTS. Further, the radio antenna system may also include a tower-top low-noise amplifier (TTLNA) and a feedline system (collectively, a receive signal path), which connects the base station located at the bottom of the tower to various components located at the top of the tower, such as the TTLNA.

It is standard practice to initialize the TTLNA in receive mode. Once the TTLNA has been initialized, the TTLNA will typically operate in either receive mode or in transmit mode. In receive mode, the TTLNA operates to receive signals from the antenna. The TTLNA passes the received signals through a sensitive microwave amplifier to amplify the signals. The amplified signals are then sent to the base station via the feedline system. In transmit mode, the TTLNA receives powerful transmit signals from the base station. In this mode, the sensitive microwave amplifier is bypassed and the powerful transmit signals from the base station are sent to the antenna.

According to current practice, the TTLNA relies on a relatively simple on-off signaling scheme to switch between receive mode and transmit mode. In this signaling scheme, the presence of a control signal causes the TTLNA to switch into transmit mode. And the absence of a signal causes the TTLNA to switch to its default resting state (i.e., receive mode). As an example, the TTLNA may rely on an On-Off-Keying (OOK) signaling scheme. In this signaling scheme, a ground to +5VDC signal transition at the base station initiates a control signal. The control signal is then sent over the feedline system to the TTLNA. The presence of this control signal switches the TTLNA to transmit mode. When the base station transitions its signaling voltage back to ground state, the control signal is terminated. And the absence of the control signal causes the TTLNA to return to is default resting state (i.e., receive mode).

SUMMARY

Disclosed herein is an improved method of protecting a low noise amplifier. In particular, a TTLNA system and associated components are disclosed that prevents the LNA from inadvertently switching into an incorrect operating mode.

In one aspect of the invention, an exemplary embodiment may take the form of a method. In accordance with the method, the TTLNA system is initialized in transmit mode. In transmit mode, the LNA in the TTLNA system is isolated from a downlink power amplifier.

In particular, the method of protecting a low noise amplifier (LNA) may include acquiring a radio frequency (RF) control channel signal at a tower top low noise amplifier (TTLNA) system. Once the RF control channel signal is acquired by the TTLNA system, the TTLNA system then determines low noise amplifier (LNA) mode information from the acquired RF control channel signal. The LNA is configured to receive mode when the LNA mode information indicates receive mode. Alternatively, the LNA is configured to transmit mode when the LNA mode information indicates transmit mode.

Preferably, the steps of protecting the LNA are carried out in a Worldwide Interoperability for Microwave Access (WiMAX). The WiMAX preferably operates in a time-division duplex (TDD) scheme. In a WiMAX system, LNA mode information determined from the acquired radio frequency control channel signal alternates from transmit to receive mode at least 200 times a second.

As an example, the step of determining LNA mode information from the acquired radio frequency control channel signal may include detecting one of a plurality of predetermined frequencies within the acquired radio frequency control channel signal. In particular, the step of detecting one of a plurality of predetermined frequencies within the acquired radio frequency control channel signal may include (i) detecting one of a plurality of predetermined frequencies to be within a first range of frequencies, and in response configuring the LNA to transmit mode, and (ii) detecting one of a plurality of predetermined frequencies to be within a second range of frequencies, and in response configuring the LNA to receive mode. The plurality of predetermined frequencies is preferably in accordance with a frequency-shift keying modulation format.

As another example, the step of determining LNA mode information from the acquired radio frequency control channel signal may include detecting a sequence of predetermined frequencies within the acquired radio frequency control channel signal. In the same embodiment, the step of detecting a sequence of predetermined frequencies within the acquired radio frequency control channel signal includes (i) detecting a first sequence of predetermined frequencies, and in response configuring the LNA to transmit mode, and (ii) detecting a second sequence of predetermined frequencies, and in response configuring the LNA to receive mode.

In the event that a loss of DC power is detected at the TTLNA system, the LNA is responsively configured to a bypass mode. In addition, in the event that a loss of the acquired RF control channel signal is detected, the LNA is configured to bypass mode. When the loss of the acquired RF control channel is detected, the LNA is configured to bypass mode only after transmit energy falls below a certain threshold level.

In another aspect of the invention, an exemplary embodiment may take the form of another method. In accordance with the method, transmit energy is monitored in a feed line. In one embodiment, the TTLNA receives a RF control channel signal indicating that the TTLNA should be switched into receive mode. In response to receiving the RF control channel signal, the TTLNA system is switched to receive mode only when transmit energy is not present in the feedline.

In yet another aspect of the invention, an exemplary embodiment may take the form of a system. In accordance with the system, an exemplary TTLNA system includes a signal extractor connected to a feedline, the signal extractor operable to extract a radio frequency control channel signal from the feed line. Further the TTLNA system includes a TTLNA controller connected to the signal extractor, the signal extractor providing the extracted radio frequency control channel signal to the TTLNA controller, the TTLNA controller operable to detect a predetermined frequency from the provided signal, wherein the predetermined frequency is selected from the group consisting of a receive frequency and a transmit frequency. Further, the TTLNA includes a switching network connected to the TTLNA controller, the switching network including at least one low noise amplifier (LNA), the switching network operable to configure the LNA to an operating mode, wherein the operating mode is selected from the group consisting of a receive mode and a transmit mode.

The TTLNA controller demodulates the extracted radio frequency control channel signal before detecting the predetermined frequency. In addition, the TTLNA controller detects the receive frequency from the provided radio frequency control channel signal, and in response, instructs the switching network to configure the LNA to the receive mode. In this embodiment, the switching network configures the LNA to receive mode only when transmit energy is not present in the feed line.

When the TTLNA controller detects the transmit frequency, the TTLNA controller responsively instructs the switching network to switch to the transmit mode. When in transmit mode, the switching network isolates the LNA from the feedline. In addition, when the TTLNA controller detects a loss of the extracted radio frequency control channel signal, the TTLNA controller automatically instructs the switching network to configure the LNA into transmit mode.

BRIEF DESCRIPTION OF THE DRAWINGS

Embodiments of the invention are described herein with reference to the drawings, in which.

DETAILED DESCRIPTION

Figure 1:
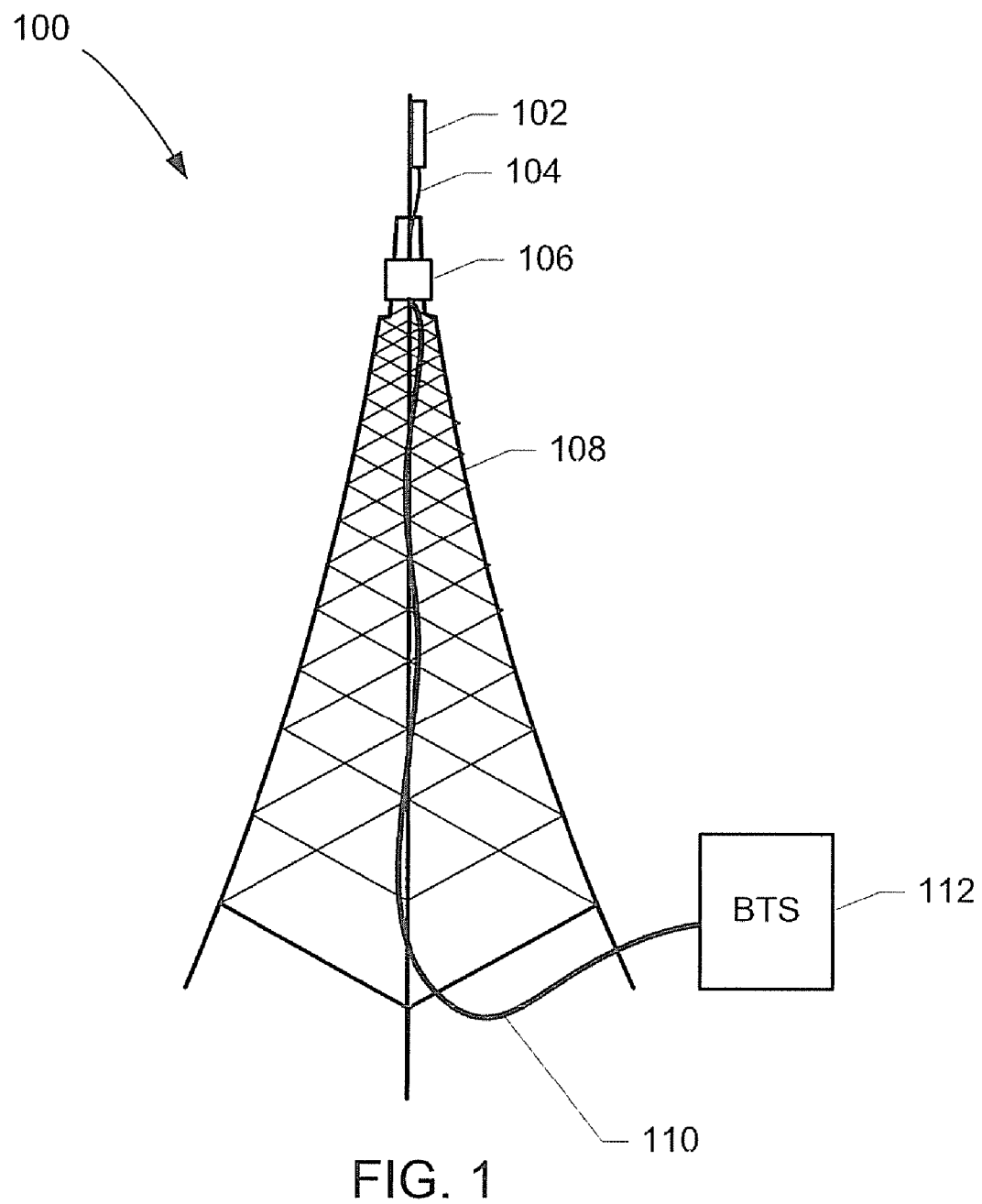
FIG. 1 is a block diagram depicting a radio antenna system, in accordance with exemplary embodiments.

FIG. 1 is a simplified block diagram depicting a radio antenna system 100 that may be used in accordance with exemplary embodiments. As illustrated, the radio antenna system 100 includes an antenna 102, a cable 104, a tower-top low noise amplifier (TTLNA) system 106, a tower 108, a feedline 110, and a base transceiver station (BTS) 112. The system illustrated in FIG. 1 preferably operates in a Worldwide Interoperability for Microwave Access (WiMAX) system (i.e., the IEEE 802.16 standard).

It should be understood that the arrangements described herein are for purposes of example only. For example, antenna 102 may include a plurality of antennas in which different antennas are dedicated to either receiving uplink signals or transmitting downlink signals. As another example, antenna 102 may be situated on a structure other than tower 108. For instance, antenna 102 may be situated on a building. As such, those skilled in the art will appreciate that other arrangements and other elements (e.g. machines, interfaces, functions, orders, and groupings of functions, etc.) can be used instead. Further, many of the elements described herein are functional entities that may be implemented as discrete or distributed components or in conjunction with other components, in any suitable combination or location.

In normal operation, antenna 102 receives uplink signals from devices in communication with the radio antenna system 100. The uplink signals received by antenna 102 are transmitted to the TTLNA system 106 via cable 104. TTLNA system 106 amplifies the received uplink signals and then sends the amplified uplink signals to BTS 112 via the feedline 110. In addition, antenna 102 operates to transmit downlink signals to devices in communication with the radio antenna system 100. The power amplifier in BTS 112 sends the downlink signals to TTLNA system 106 via the feedline 110. The TTLNA system 106 then passes the downlink signals via cable 104 to antenna 102. The downlink signal is then transmitted to device in communication with radio antenna system 100, via antenna 102.

Radio antenna system 100 separates uplink and downlink signals by using a time division duplex (TDD) transmission scheme. Using the TDD transmission scheme, BTS 112 assigns a common frequency channel to both the uplink and downlink communication signals. BTS 112 toggles back and forth between sending communications signals to the antenna 102 (i.e., downlink signals) and receiving communication signals from the antenna 102 (i.e., uplink signals). In a preferred transmission scheme such as WiMAX, BTS 112 may switch between receiving uplink signals and sending downlink signals up to 200 times a second.

In a TTD transmission scheme, feedline 110 carries amplified uplink signals from the TTLNA system 106 to the BTS 112 during a first time period. And in a second time period, the feedline 110 carries downlink signals from the BTS 112 to the antenna 102 via TTLNA system 106. In this way, feedline 110 alternates between carrying uplink and downlink communication signals.

Along with carrying uplink signal and/or downlink signals, feedline 110 also carries other signals to and from the antenna 102. As examples, feedline 110 carries DC power up from the BTS 112 to power the TTLNA system 106 and other components located at the top of the tower 108. In addition, feedline 110 also carries RF control channel signals from BTS 112 to TTLNA system 106. The first radio frequency control channel signal may instruct the TTLNA system 106 to switch to receive mode. And the second radio frequency control channel signal may instruct the TTLNA system 106 to switch to transmit mode. The first and second radio frequency control channel signals may operate at different frequencies. Still further, the feedline 110 may carry an Antenna Interface Standards Group (AISG) signal, which is used to monitor the system status and provide control over non-time critical functions. For example, the AISG signal may be used for positioning the antenna 102.

Figure 2:
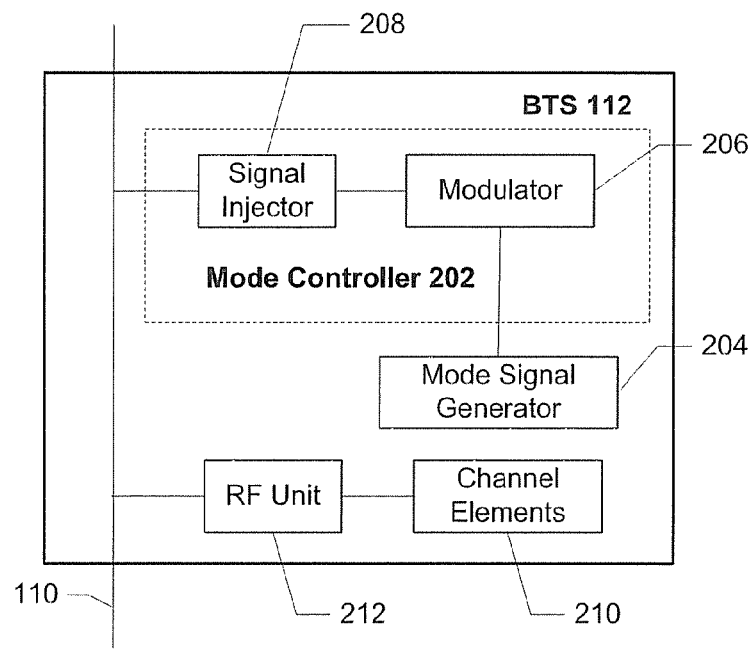
FIG. 2 is a block diagram depicting components of a base transceiver station (BTS), in accordance with exemplary embodiments.

The RF control channel signals used to configure the TTLNA system 106 in either transmit mode or receive mode are generated by the BTS 112 and/or components associated therewith. For instance, as shown in FIG. 2, the RF control channel signals may be generated by a mode controller 202 (shown by the dotted line) in BTS 112. Mode controller 202 may be a functional unit by itself that may be physically situated outside the BTS 112. Instead and/or in addition, some components of the mode controller 202 may be located in the BTS 112, while some components of mode controller 202 may be situated outside the BTS 112.

FIG. 2 is a simplified block diagram of an exemplary BTS 112, which may be used in accordance with exemplary embodiments. In particular, FIG. 2 depicts a mode signal generator 204, a modulator 206, a signal injector 208, channel elements 210, a radio frequency (RF) unit 212, and the feedline 110. Preferably, these components are housed in a cabinet at the BTS 112. It should be understood that these components may be distributed over one or more cabinets. Additionally, the components shown are merely illustrative. For instance, BTS 112 may include additional components such as a power system for generating power, and/or an (American Interface Standards Group) AISG modem. Other components are also possible.

Mode signal generator 204 may be a processor in the BTS 112. The processor may be programmed to generate high and low signals at fixed time intervals. As an example, the processor may generate a high signal for a fixed period of time and then a low signal for the fixed period of time. Preferably, a transition from high to low indicates transmit mode. And a transition from low to high indicates receive mode. The processor may be responsible for controlling other components of BTS 112.

Modulator 206 generates the RF control signals that instructs the TTLNA system 106 to switch into either transmit mode or receive mode. For instance, modulator 206 may generate a first signal with a first predetermined frequency and a second signal with a second predetermined frequency. The first predetermined frequency may instruct that the TTLNA system 106 should switch to transmit mode. And the second predetermined frequency may instruct that the TTLNA system 106 should switch to receive mode. In addition, modulator 206 generates the first and second predetermined frequencies according to a frequency-shift keying (FSK) modulation format.

Instead or in addition, modulator 206 may generate a first predetermined sequence of frequencies to indicate that the TTLNA system 106 should be in transmit mode and second predetermined sequence of frequencies to indicate that TTLNA system 106 should switch to receive mode.

Channel elements 210 generate the downlink signals, which are provided to RF Unit 212. RF Unit 212 operates to handle the uplink signals and downlink signals. The uplink and downlink signals on feedline 110 operate at a much higher frequency than the control signals. For example, the uplink and downlink signals typically operate at frequencies that are between 2.5-2.7 GHz, while the RF control signals typically operate at frequencies below 20 MHz.

Figure 3:
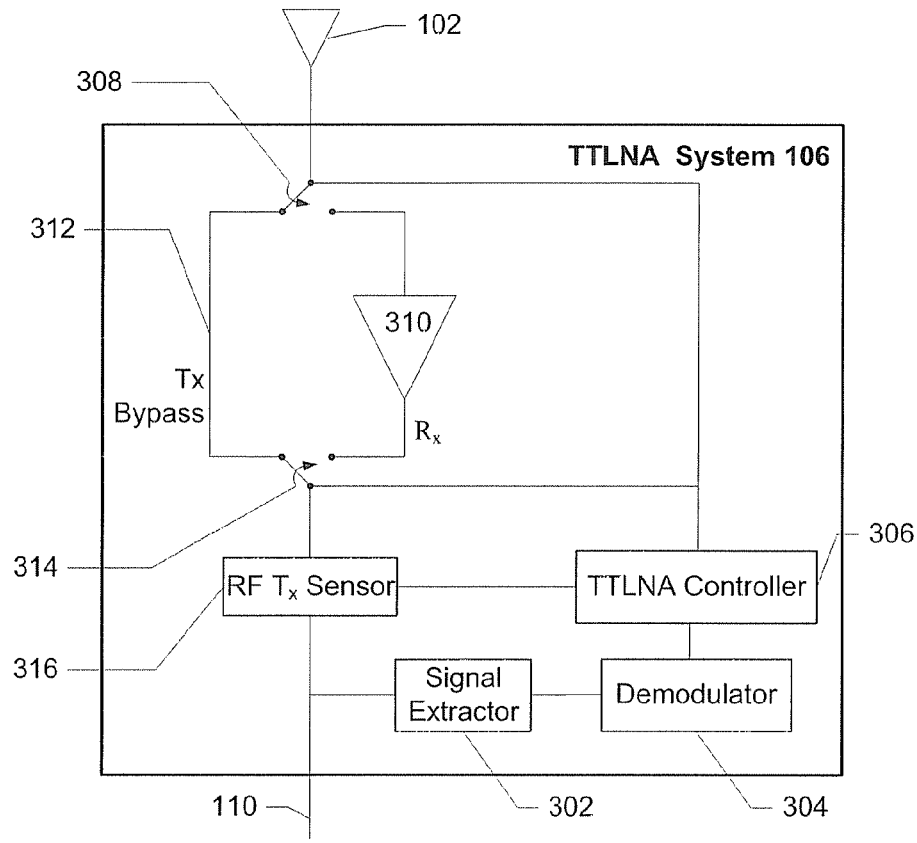
FIG. 3 is a block diagram depicting components of a tower-top low noise amplifier (TTLNA) system, in accordance with exemplary embodiments.

The RF control channel signals generated by the mode controller 202 control the mode in which TTLNA system 106 operates. FIG. 3 is a simplified block diagram of an exemplary TTLNA system 106, which may be used in accordance with exemplary embodiments. In particular, FIG. 3 depicts a signal extractor 302, a demodulator 304, a TTLNA Controller 306, switches 308 and 314, a low noise amplifier (LNA) 310, and a RF transmit ($T_x$) sensor 316.

Signal extractor 302 extracts the RF control channel signals from the feedline 110 that were injected by the signal injector 208 of the mode controller 202. Demodulator 304 demodulates the signals extracted by signal extractor 302. TTLNA Controller 306 receives the demodulated signals from demodulator 304. In addition, TTLNA Controller 306 receives signals from RF Transmit ($T_x$) Sensor 316, which senses whether transmit energy from the BTS 112 (i.e., downlink signals) is present on the feedline 110. Based at least in part on the signals received by the TTLNA Controller 306, TTLNA Controller 306 controls switches 308 and 314.

The position of switches 308 and 314 determines whether LNA 310 is operating in transmit mode ($T_x$) or receive mode (Rx). According to the position of switches as illustrated in FIG. 3, LNA 310 is currently operating in transmit/bypass mode 312. In this mode, the LNA 310 is bypassed and disconnected from the feedline 110.

In receive mode, switches 308 and 314 are positioned such that the LNA 310 is connected to the feedline 110. In this mode, LNA 310 operates to receive signals from antenna 102. The received signals are amplified by the LNA 310. The amplified signals are then passed down feedline 110 to BTS 112.

As shown in FIG. 3, the LNA 310 may operate in one of two modes: (i) transmit/bypass mode and (ii) receive mode. It should be understood that the transmit/bypass (which will be referred to as transmit mode from this point forward) mode may exist as two separate modes in the TTLNA system 106. As such, switches 308 and 314 may have more than two positions. For example, switching devices 308 and 314 may be configured to a third position in which the TTLNA system 106 operates only in a bypass mode. Bypass mode may be used to indicate an error condition in the TTLNA system 106. For instance, in the event that the LNA 310 malfunctions or dies, TTLNA Controller 306 may automatically configure the switches 308 and 314 to bypass mode.

Signal extractor 302 may be a Bias "T". Switching devices 308 and 314 may be magnetic circulators or microwave PIN diode switches. Further, RF $T_x$ Sensor 316 may be a microwave RF sensor optimized for detecting frequencies between 2.5 GHz to 2.7 GHz.

As noted above, radio antenna system 100 operates in a TDD transmission scheme. As the feedline 110 alternates between receiving uplink and sending downlink signals, the TTLNA system 106 must also alternate between transmit mode and receive mode. When the feedline 110 is carrying downlink signals to the antenna 102, it is critical that the LNA 310 is not configured to receive mode. Should the LNA 310 be in receive mode when feedline 110 is carrying downlink signals to the antenna 102 (because of a failure to properly to switch modes), the downlink signals may damage the sensitive LNA 310 resulting in a possible sector outage. In such a scenario, a technician may need to physically climb the tower to replace and/or repair the damaged LNA 310.

According to exemplary embodiments disclosed herein, the TTLNA system 106 is initialized in transmit mode and switches to receive mode only when it receives a command to do so. Otherwise, the TTLNA system 106 is configured to operate in transmit mode 312. Further, after receiving a command to switch into receive mode, but before actually switching into receive mode, TTLNA system 106 determines whether transmit energy is present in the feedline 110. TTLNA system 106 switches to receive mode only after ensuring that the transmit energy is either below a certain threshold in the feedline 110 or no transmit energy is present on the feedline 110. By operating in such a manner, TTLNA system 106 prevents itself from inadvertently switching into receive mode when downlink signals may be present in the feedline 110.

Figure 4:
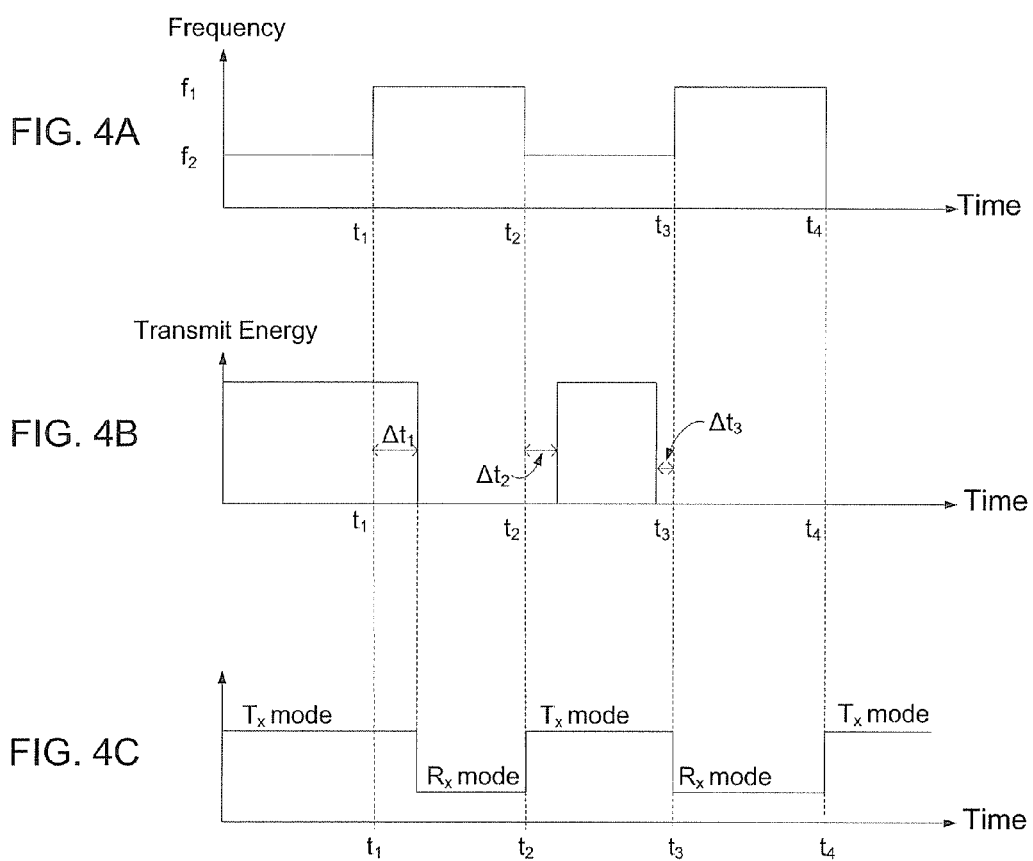
FIG. 4A is a timing diagram depicting the when the TTLNA system detects mode information.
FIG. 4B is a timing diagram depicting when the TTLNA system detects the presence of downlink signals in the feedline.
FIG. 4C is a timing diagram depicting when TTLNA system switches the LNA between transmit mode and receive mode.

In addition, operating in such a manner requires that switching of TTLNA modes are timed according to whether the BTS 112 is receiving uplink signals or sending downlink signals. FIGS. 4A-4C illustrate various timing diagrams, which depict the operation of TTLNA system 106 in accordance with exemplary embodiments. FIG. 4A is a timing diagram depicting mode information from the RF control channel signals that are injected into the feedline 110 by signal injector 208 in the BTS 112. FIG. 4B is a timing diagram depicting transmit energy being carried in the feed line 110. And FIG. 4C is a timing diagram depicting when TTLNA Controller 306 instructs the switches 308 and 314 to switch between transmit mode and receive mode.

As shown in FIG. 4A, TTLNA Controller 306 detects (via extractor 302 and demodulator 304) a first RF control channel signal with a first predetermined frequency ($f_1$) from time $t_0$ to time $t_1$. And then at time $t_1$, TTLNA Controller 306 detects a second RF control channel signal with a second predetermined frequency ($f_2$) from time $t_1$ to time $t_2$. The first and second RF control channel signals indicate TTLNA mode information. For instance, as shown in FIG. 4A, the first RF control channel signal with the first predetermined frequency ($f_1$) indicates transmit mode and the second RF control channel signal with the second predetermined frequency ($f_2$) indicates receive mode.

At time $t_1$, TTLNA Controller 306 detects a RF control channel signal that indicates receive mode. When TTLNA Controller 306 detects a RF control channel signal that indicates receive mode, TTLNA Controller 306 will use signals from RF $T_x$ Sensor 316 to determine whether transmit energy is present in the feedline 110. If transmit energy is present in the feedline 110, then BTS 112 is still transmitting downlink signal to antenna 102. TTLNA Controller 306 will wait until transmit energy disappears from the feedline 110. And once the transmit energy disappears from the feedline 110, TTLNA Controller 306 will operate the switches 308 and 314 to configure LNA 310 to receive mode. For instance, as shown in FIGS. 4B and 4C, it is only after the transmit energy disappears at $t+\Delta t_1$, that the TTLNA Controller 306 configures the switches 308 and 314 from transmit ($T_x$)) mode to receive (Rx) mode. In addition, $\Delta t_1$ preferably takes into account any delays that may be needed to give switches 308 and 314 sufficient time to switch from one mode to another.

At time $t_2$, TTLNA Controller 306 detects a RF control channel signal that indicates transmit mode. Preferably, TTLNA Controller 306 will detect the RF control channel signal that indicates transmit mode some time before BTS 112 begins sending downlink signals. For instance, as illustrated in FIG. 4B, TTLNA Controller 306 receives control channel signals indicating transmit mode $\Delta t_2$ before transmit energy (i.e., downlink signals) is sent over the feedline 110. By doing so, this allows TTLNA controller 306 to take into account any mechanical delays that may be needed to give switches 308 and sufficient time to switch from one mode to another. As shown in FIGS. 4B and 4C, by the time the transmit energy appears, TTLNA Controller 306 has configured the switches 308 and 314 such that the LNA 310 is disconnected from the feedline 110.

At time $t_3$, TTLNA Controller 306 detects a RF control channel signal that indicates receive mode. TTLNA Controller 306 then uses signals from RF $T_x$ Sensor 316 to determine whether transmit energy is present in the feedline 110. And it is only when no transmit energy is present in the feedline 110 that the TTLNA Controller 306 configures the switches 308 and 314 so that the LNA 310 operates in receive mode. And as shown in FIG. 4B, BTS 112 preferable stops sending transmit energy over the feedline 110 at some time $\Delta t_3$ before time $t_3$.

At time $t_4$, TTLNA Controller 306 detects a loss of the acquired RF control channel signal. As soon as the TTLNA Controller 306 detects a loss of the acquired RF control channel signal, the TTLNA controller 306 automatically operates the switches 308 and 314 to configure the LNA 310 into transmit mode. Alternatively, TTLNA Controller 306 may configure the TTLNA system 106 to bypass mode. The TTLNA system 106 may remain in this until the TTLNA Controller 306 begins to acquire a RF control Channel signal. In addition, when TTLNA Controller 306 detects loss of an acquired RF control channel signal, TTLNA controller may send a separate signal to the BTS 112 indicating that the TTLNA system 106 is now in an error condition. In this way, by responsively configuring LNA 310 in to transmit mode, TTLNA Controller 306 protects the LNA 310 by disconnecting the LNA 310 from the feedline 110.

Figure 5:
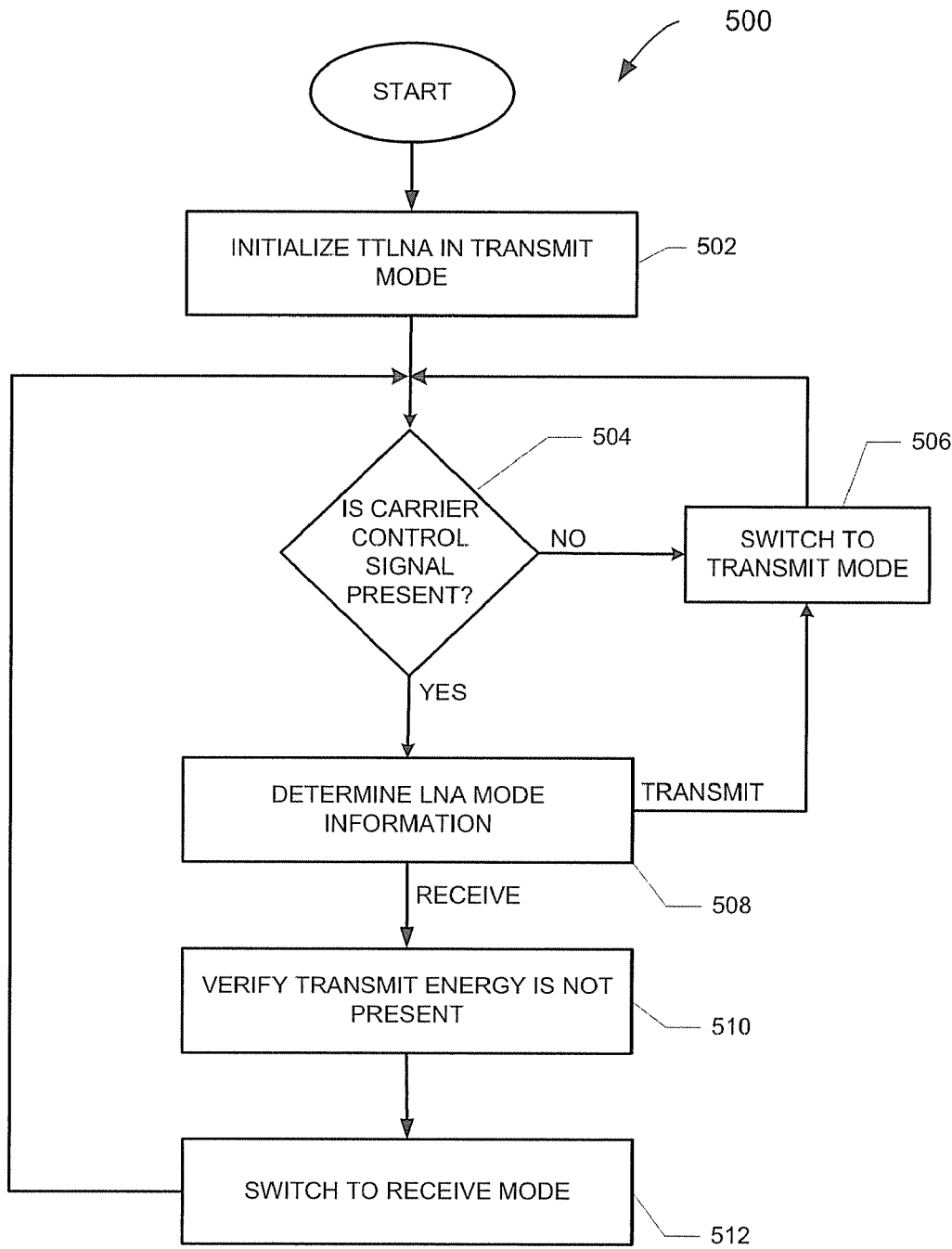
FIG. 5 is a flowchart of a method, in accordance with exemplary embodiments.

FIG. 5 is a flowchart depicting a method of protecting LNA 310 in accordance with an exemplary embodiment. Although described below as being carried out by TTLNA Controller 306, as a general matter, it should be understood that method 500 could be carried out by one or combination of demodulator 304, signal extractor 302, RF $T_x$ Sensor 316, and/or any other components of TTLNA 106. As noted above, the method illustrated in FIG. 5 is performed continuously once the TTLNA 106 is initialized into transmit mode.

As shown in FIG. 5, method 500 begins at block 502 when LNA 310 is initialized. During initialization, TTLNA Controller 306 operates switches 308 and 314 to configure the TTLNA 106 in transmit mode. In this mode, as shown in FIG. 3, switches 308 and 314 are positioned such that the LNA 310 is disconnected from the feedline 110. Once initialized, the transmit mode becomes the default resting state for the TTLNA 106. By initializing the TTLNA 106 into transmit mode as its default resting state, the LNA 310 is isolated from the feedline 110. Further, by setting the transmit mode as TTLNA 106's default resting state, TTLNA system 106 will use the LNA 310 only when it needs to. In this way, the sensitive LNA 310 will be connected to the feedline 110 only after the TTLNA Controller 306 detects an affirmative indication from the BTS 112 that the TTLNA should be in receive mode.

Next block 504 includes making a determination of whether the carrier of the control signal is present. As an example, TTLNA Controller 306 may make this determination from signals received from the demodulator 304. Demodulator 304 may provide TTLNA Controller 306 with a carrier status signal indicating that the carrier of control signal is present. Demodulator 304 may include two selective filters that provide carrier status signals to TTLNA Controller 306. If either one of the two filters fail to provide carrier status signals, then TTLNA Controller 306 may determine that the carrier of the control signal is present. Alternatively, if at any time, both of the selective filters stop providing any signals, then the TTLNA Controller 306 may determine that the carrier of the control signal is not present. In such a case, as shown at block 506, TTLNA Controller 306 will automatically configure the switches 308 and 314 so that the LNA 310 is in its default resting state (i.e., transmit mode).

If the TTLNA Controller 306 determines that the carrier of the control signal is present, then TTLNA Controller 306 will proceed to block 508. At block 508, the TTLNA Controller 306 may determine LNA mode information from the acquired RF control channel signal. In one embodiment, TTLNA Controller 306 may make this determination by detecting one of a plurality of predetermined frequencies to be within either a first range of frequencies or a second range of frequencies. If the TTLNA Controller 306 determines that this frequency is within a first range of frequencies, then the TTLNA Controller 306 may determine that LNA mode information is transmit mode. Alternatively, in the same embodiment, if the TTLNA Controller 306 determines that this frequency is within a second range of frequencies, then the TTLNA Controller 306 may determine the LNA mode information is receive mode.

In another embodiment, TTLNA Controller 306 may make this determination by detecting a first sequence of predetermined frequencies or a second sequence of predetermined frequencies. The first sequence of predetermined frequencies may indicate that the mode information is transmit mode.

Alternatively, the second sequence of predetermined frequencies may indicate that the mode information is receive mode.

Once the TTLNA Controller 306 has determined LNA mode information, TTLNA Controller 306 will then either proceed to either block 506 or block 510. If the TTLNA Controller 306 determines that the LNA mode information is transmit mode, then the TTLNA Controller 306 will proceed to block 506. And as shown in FIG. 5, at block 510, TTLNA Controller 306 configures the LNA 310 to transmit mode. In one embodiment, TTLNA Controller 306 may operate switches 308 and 314 so that the LNA 310 is disconnected from the feedline 110. In particular, TTLNA Controller 306 may send control signals to switches 308 and 314 to configure them so that TTLNA is configured to transmit mode.

Alternatively, if the TTLNA Controller 306, at block 508 determines that the mode information in the acquired RF control channel signal is receive mode, then the TTLNA Controller 306 proceeds to block 510. As shown at block 510, TTLNA Controller 306 verifies that no transmit energy is preset on the feedline 110. In one embodiment, TTLNA Controller 306 may use the signals received from RF $T_x$ sensor 316 to determine whether transmit energy is present in the feedline 110. As an example, RF $T_x$ Sensor 316 may provide a digital signal indicating that the transmit energy is present in the feedline. If the TTLNA Controller 306 determines that transmit energy is present in the feedline 110, TTLNA Controller 306 may wait until transmit energy disappears from the feedline 110. Once the transmit energy disappears from the feedline 110, TTLNA Controller 306 operates switches 308 and 314 to configure LNA 310 to receive mode.

In another embodiment, TTLNA Controller 306 may use the signals received from RF $T_x$ sensor 316 to determine whether the transmit energy present in the feedline is below a certain threshold. The TTLNA Controller 306 may wait until it determines that the transmit energy in the feedline has fallen below a certain threshold. And once the transmit energy falls below a certain threshold, TTLNA Controller 306 operates switches 308 and 314 to configure LNA 310 to receive mode.

Exemplary embodiments of the present invention have been described above. Those skilled in the art will understand, however, that changes and modifications may be made to the embodiments described without departing from the true scope and spirit of the present invention, which is defined by the claims.

The invention claimed is:

1. A method of protecting a low noise amplifier (LNA), the method comprising:
acquiring a radio frequency control channel signal at a tower top low noise amplifier (TTLNA) system; and
determining LNA mode information from the acquired radio frequency control channel signal, wherein the step of determining LNA mode information from the acquired radio frequency control channel signal comprises detecting one of a plurality of predetermined frequencies within the acquired radio frequency control channel signal, wherein the step of detecting the one of the plurality of predetermined frequencies comprises:
detecting a first predetermined frequency of the plurality of predetermined frequencies to be within a first range of frequencies, and in response configuring the LNA to transmit mode, and
detecting a second predetermined frequency of the plurality of predetermined frequencies to be within a second range of frequencies, and in response configuring the LNA to receive mode.

2. The method of claim 1, further comprising:
determining that the TTLNA is being initialized, and in response, setting the TTLNA into transmit mode.

3. The method of claim 1, wherein the LNA mode information alternates from transmit mode to receive mode at least 200 times per second.

4. The method of claim 1, wherein configuring the LNA comprises switching modes according to a time-division duplex (TDD) transmission scheme.

5. The method of claim 1, wherein the step of configuring the LNA to transmit mode comprises isolating the LNA amplifier circuit from a downlink power amplifier.

6. The method of claim 1, wherein the plurality of predetermined frequencies are in accordance with a frequency-shift keying (FSK) modulation format.

7. A method of protecting a low noise amplifier (LNA), the method comprising:
acquiring a radio frequency control channel signal at a tower top low noise amplifier (TTLNA) system;
determining LNA mode information from the acquired radio frequency control channel signal comprising detecting a sequence of predetermined frequencies within the acquired radio frequency control channel signal, wherein detecting a sequence of predetermined frequencies within the acquired radio frequency control channel signal comprises:
(i) detecting a first sequence of predetermined frequencies, and (ii) in response configuring the LNA to transmit mode, and
(iii) detecting a second sequence of predetermined frequencies, and (iv) in response configuring the LNA to receive mode;
configuring the LNA to receive mode when the LNA mode information indicates receive mode; and
configuring the LNA to transmit mode when the LNA mode information indicates transmit mode.

8. The method of claim 1, further comprising,
detecting a loss of DC power at the TTLNA system and in response configuring the LNA to bypass mode.

9. The method of claim 1, further comprising,
detecting an acquisition loss of the acquired radio frequency control channel signal and in response configuring the LNA to bypass mode.

10. The method of claim 9, wherein configuring the LNA to receive mode occurs after transmit energy falls below a threshold level.

11. The method of claim 1, wherein the steps of claim 1 are carried out in a Worldwide Interoperability for Microwave Access (WiMAX) system.

12. A tower top low noise amplifier (TTLNA) system comprising:
a signal extractor connected to a feed line, the signal extractor operable to extract a radio frequency control channel signal from the feed line;
a TTLNA controller connected to the signal extractor, the signal extractor providing the extracted radio frequency control channel signal to the TTLNA mode controller, the TTLNA controller operable to detect at least a first predetermined frequency within a first range of frequencies and a second predetermined frequency within a second range of frequencies from the provided signal;
a switching network connected to the TTLNA controller, the switching network comprising at least one low noise amplifier (LNA), the switching network operable to switch to an operating mode, wherein the operating mode is selected from the group consisting of a receive mode and a transmit mode,
wherein, in response to detecting the first predetermined frequency, the TTNLA configures the LNA to receive mode, and
wherein in response to detecting the second predetermined frequency, the TTNLA configures the LNA to transmit mode.

13. The TTLNA system of claim 12, wherein the TTLNA controller demodulates the extracted radio frequency control channel signal before detecting the predetermined frequency.

14. The TTLNA system of claim 12, wherein the TTLNA controller detects the receive frequency from the provided radio frequency control channel signal, and in response, instructs the switching network to switch to the receive mode.

15. The TTLNA system of claim 14, wherein the switching network switches to the receive mode only when radio frequency transmit energy is not present in the feed line.

16. The TTLNA system of claim 12, wherein the TTLNA controller detects the transmit frequency and in response, instructs the switching network to switch to the transmit mode.

17. The TTLNA system of claim 16, wherein the switching network switches into the transmit mode by isolating the LNA.

18. The TTLNA system of claim 12, where in the TTLNA controller detects a loss of the extracted radio frequency control channel signal, and in response, automatically instructs the switching network to switch into transmit mode.

* * * * *